F. A. ROBERTS.
Potato Digger.
No. 85,182.
Patented Dec. 22, 1868.
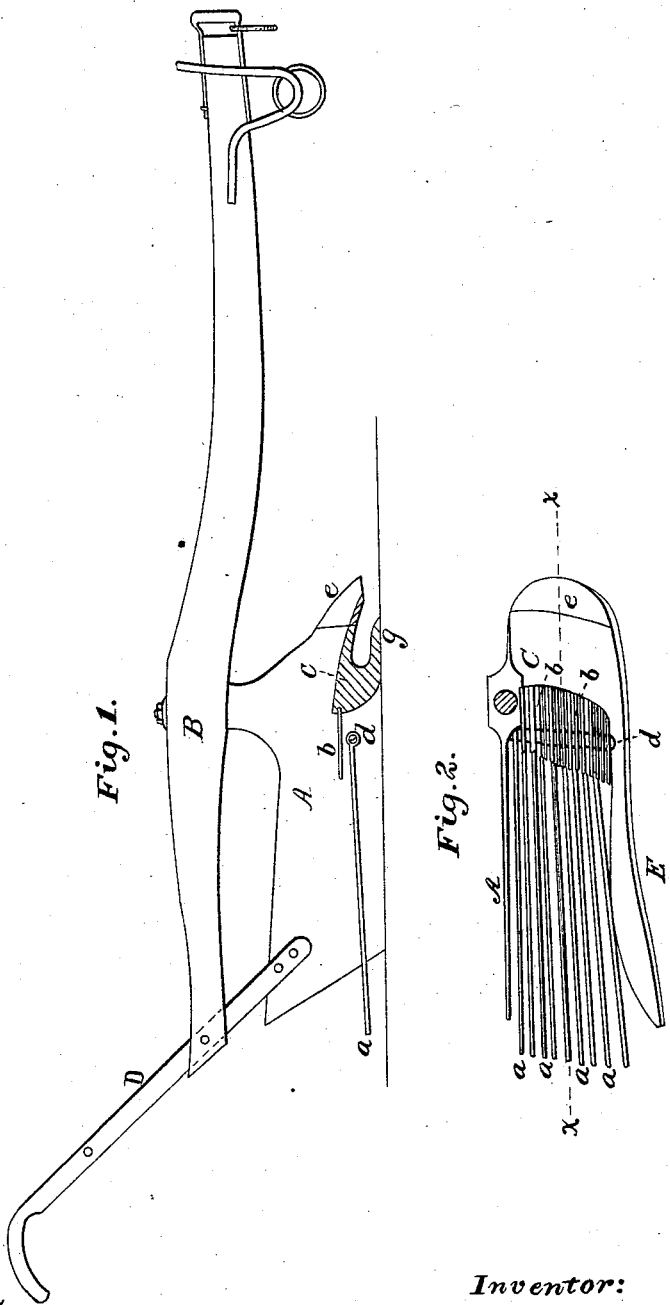

United States Patent Office.

FRANCIS A. ROBERTS, OF NORTH VASSALBOROUGH, MAINE.

Letters Patent No. 85,182, dated December 22, 1868.

IMPROVEMENT IN POTATO-DIGGER.

The Schedule referred to in these Letters Patent and making part of the same.

*To all whom it may concern:*

Be it known that I, FRANCIS A. ROBERTS, of North Vassalborough, in the county of Kennebec, and State of Maine, have invented a new and improved Potato-Digger; and I do hereby declare that the following is a full, clear, and exact description thereof, which will enable others skilled in the art to make and use the same, reference being had to the accompanying drawings, forming part of this specification, in which—

Figure 1 is a side view of my invention from a section taken through the scoop at the line $x$-$x$ of fig. 2.

Figure 2 is a top view of the scoop.

Similar letters of reference indicate like parts.

The object of this invention is to bring potatoes from the hill in which they grow by the ordinary operation of plowing.

It consists of a scoop attached to a plow-beam and handles in a manner similar to that by which a plow-share is attached.

It consists of a sifting-device by which the soil is riddled from the potatoes, and the latter discharged and left on the surface of the ground.

Other devices, perfecting the whole, render this plow efficient in digging potatoes, as will be shown.

The scoop consists of two wings, A and E, continuously connected with each other in front, and provided with a cutting-tip, $e$, of steel or other suitable metal.

The part G, connecting the wings, is provided with short fingers, $b$ $b$, &c., which constitute a sieve, or riddle, and which projects backward over the front end of the hinged riddle, as shown.

The hinged riddle forms a bottom between the wings, and is hinged to the wings by the pivot-bar $d$, as shown.

The hinged riddle reaches backward and downward into the furrow formed by the passing scoop, and thus presents an incline, down which the potatoes pass as the scoop is drawn forward in the centre of the potato-hill.

A trenching-point, $g$, is affixed to or forms part of the scoop, as shown, and is for the purpose of cutting a lower trench or furrow than that made by the scoop, so that the rear end of the hinged riddle will have space to drop, and thus form an incline suitable for the better working of the machine.

This latter riddle consists of fingers $a$ $a$ $a$, &c., affixed to the hinge-bar $d$, which latter has bearings in the wings A and E, as shown.

The fingers $b$ $b$ $b$, &c., may be cast into the scoop, or may be affixed thereto in any suitable manner.

A modification of my invention is contemplated by me, wherein the hinged riddle may be dispensed with, and by providing an inclined plane at the front part of the scoop, that is to say, between the point $c$ and the riddle, whereby the potatoes and the earth are forced up the incline as the scoop passes forward, thus obtaining a sufficient incline to the riddle without employing the trenching-point $g$, before described, for the front end of the riddle (there being but one riddle in this case) will connect with the upper edge of the said incline, and the riddle descending backward with a suitable incline, which incline will serve, as in the first case, to discharge the potatoes out from the surrounding earth that is taken into the scoop with them, and also provide a space below the riddle, into which the earth can escape, as in the case of the trench.

The scoop is attached to a plow-beam, B, and handles D, in any convenient manner, as shown.

The handles are bolted to the wings of the scoop, as shown.

Having thus described my invention,

I claim as new, and desire to secure by Letters Patent—

1. The scoop A E, $e$, substantially as described, having a hinged riddle, $a$ $a$ $a$, &c., and fixed riddle $b$ $b$, all as and for the purpose set forth.

2. The scoop A E, $e$, and a fixed riddle, $b$ $b$, substantially as shown and described, in combination with a plow-beam, B, and handle D, all as and for the purpose set forth.

The above specification of my invention signed by me, this 19th day of March, 1868.

F. A. ROBERTS.

Witnesses:
 THOS. S. LANG,
 ISAAC JENKINS.